United States Patent
Zhu et al.

(10) Patent No.: US 10,168,760 B2
(45) Date of Patent: Jan. 1, 2019

(54) POWER MANAGEMENT OF USER INTERFACES WITH COORDINATED ULTRA-LOW POWER STATES

(71) Applicant: Intel Corporation, Santa Clara, CA (US)

(72) Inventors: Zhenyu Zhu, Folsom, CA (US); Anoop Mukker, Folsom, CA (US); Daniel Nemiroff, El Dorado Hills, CA (US); Nobuyuki Suzuki, Portland, OR (US); David W. Vogel, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 258 days.

(21) Appl. No.: 15/074,774

(22) Filed: Mar. 18, 2016

(65) Prior Publication Data
US 2017/0153687 A1 Jun. 1, 2017

Related U.S. Application Data

(60) Provisional application No. 62/261,669, filed on Dec. 1, 2015.

(51) Int. Cl.
*G06F 1/00* (2006.01)
*G06F 1/32* (2006.01)
*G06F 1/26* (2006.01)

(52) U.S. Cl.
CPC ............ *G06F 1/3234* (2013.01); *G06F 1/266* (2013.01); *G06F 1/325* (2013.01); *G06F 1/3206* (2013.01); *Y02D 50/20* (2018.01)

(58) Field of Classification Search
CPC .................................... G06F 1/32; G06F 1/26
See application file for complete search history.

(56) References Cited

U.S. PATENT DOCUMENTS

| | | | |
|---|---|---|---|
| 7,254,732 B2 * | 8/2007 | Bashford | G06F 1/3203 713/300 |
| 9,098,259 B1 | 8/2015 | Lachwani et al. | |
| 9,128,703 B1 * | 9/2015 | Lachwani | G06F 1/3203 |
| 2003/0018925 A1 * | 1/2003 | Mohammad | G06F 1/3203 713/600 |
| 2005/0169356 A1 * | 8/2005 | Matsumoto | G06F 1/3203 375/220 |
| 2006/0069816 A1 * | 3/2006 | Oshikawa | G06F 1/3221 710/14 |

(Continued)

FOREIGN PATENT DOCUMENTS

WO 2015047782 A1 4/2015

OTHER PUBLICATIONS

PCT International Search Report, PCT Application No. PCT/US2016/056946, dated Jan. 26, 2017, 3 pages.

*Primary Examiner* — Phil K Nguyen
(74) *Attorney, Agent, or Firm* — International IP Law Group, P.L.L.C.

(57) ABSTRACT

An example method for power management of a user interface includes initiating a low power entry at a data lane of the user interface. The method further includes coordinating with a peripheral device to enter into an ultra-low power state. The peripheral device is to initiate a low power entry at the clock lane to enter the user interface into an ultra-low power state in response to detecting the low power entry at the data lane.

17 Claims, 4 Drawing Sheets

(56) References Cited

U.S. PATENT DOCUMENTS

| | | | |
|---|---|---|---|
| 2010/0165865 A1* | 7/2010 | Fang | H04L 12/10 370/252 |
| 2010/0169687 A1* | 7/2010 | Kimura | G06F 1/3221 713/324 |
| 2010/0281183 A1* | 11/2010 | Van Bebber | G06F 1/266 710/5 |
| 2010/0325457 A1* | 12/2010 | Lachwani | G06F 1/3203 713/323 |
| 2013/0212408 A1* | 8/2013 | Fernald | G06F 1/324 713/300 |
| 2014/0089693 A1 | 3/2014 | Ooi | |
| 2014/0269471 A1 | 9/2014 | Wagh et al. | |
| 2015/0130822 A1* | 5/2015 | Lee | G09G 3/20 345/520 |
| 2015/0227190 A1 | 8/2015 | Adewale et al. | |
| 2017/0123472 A1* | 5/2017 | Kodavalla | G06F 1/324 |

* cited by examiner

POWER MANAGEMENT OF USER INTERFACES WITH COORDINATED ULTRA-LOW POWER STATES

CROSS-REFERENCE TO RELATED APPLICATION

The present application claims the benefit of U.S. Provisional Patent Application Ser. No. 62/261,669 by Zhu, et al., which is titled "Power Management of User Interfaces with Coordinated Ultra-Low Power States" and was filed Dec. 1, 2015, the disclosure of which is incorporated herein by this reference as though fully set forth herein.

TECHNICAL FIELD

The present techniques relate generally to power management of interfaces. More particularly, the present techniques relate to power management of user interfaces.

BACKGROUND ART

High bandwidth serial user interfaces are used to connect peripheral devices to computing devices. For example, peripheral devices can include touch-enabled displays and cameras, among other peripheral devices.

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

As described above, high bandwidth user interfaces are used to connect peripheral devices such as touch-enabled displays and cameras to computing devices. However, peripheral devices such as touch-enabled displays and cameras are sensitive to latency, which can cause an undesirable user experience. Thus, such user interfaces typically do not enter a very low power state, such as an ultra-low power state (ULPS), in order to keep response times lower. In addition, with source synchronous serial user interfaces such as touch screens, clock lanes and data lanes are controlled by opposite sides of the user interface. For example, an input clock lane can be controlled by a device while a data lane is controlled by a host.

The present techniques relate generally to techniques for coordinating low power states at user interfaces. The techniques relate to power management at a link layer that can coordinate ultra-low power states. The techniques enable power management to be optimized in both directions without increasing exit latency. Moreover, embodiments include host wakeup and touch response wakeup. Thus, the present techniques enable robust power management while keeping response time at a minimum. Furthermore, the power management process can be pipelined.

Figure 1:
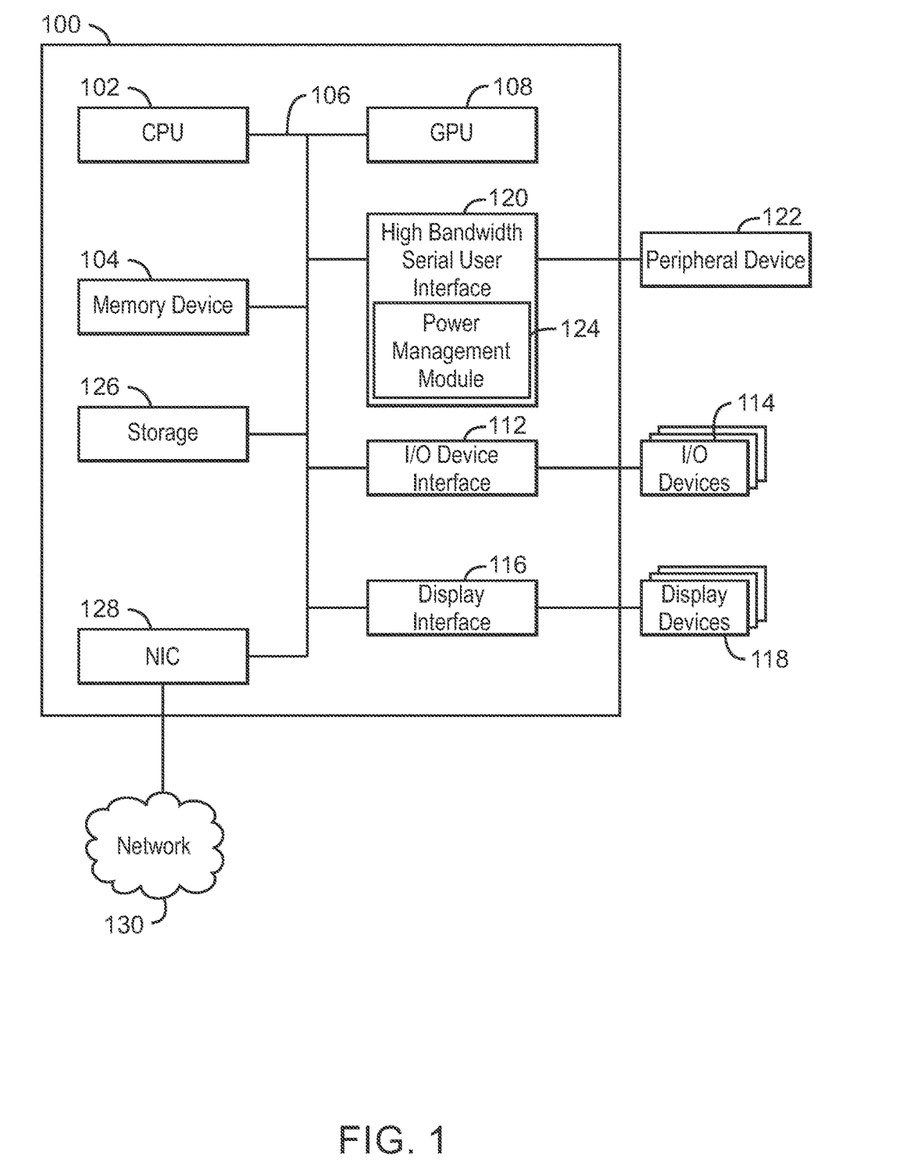
FIG. 1 is a block flow diagram of an example computing device that can manage power at a link layer.

FIG. 1 is a block diagram illustrating an example computing device that can manage power at a link layer. The computing device 100 may be, for example, a laptop computer, desktop computer, or server, among others. The computing device 100 may include a central processing unit (CPU) 102 that is configured to execute stored instructions, as well as a memory device 104 that stores instructions that are executable by the CPU 102. The CPU 102 and the memory device may be coupled to a bus 106. The CPU 102 and the memory device 104 can be coupled together via the bus 106. Additionally, the CPU 102 can be a single core processor, a multi-core processor, a computing cluster, or any number of other configurations. Furthermore, the computing device 100 may include more than one CPU 102. The memory device 104 can include random access memory (RAM), read only memory (ROM), flash memory, or any other suitable memory systems. For example, the memory device 104 may include dynamic random access memory (DRAM).

The computing device 100 may also include a graphics processing unit (GPU) 110. As shown, the CPU 102 may be coupled through the bus 106 to the GPU 110. The GPU 110 may be configured to perform any number of graphics operations within the computing device 100. For example, the GPU 110 may be configured to render or manipulate graphics images, graphics frames, videos, or the like, to be displayed to a user of the computing device 100.

The memory device 104 can include random access memory (RAM), read only memory (ROM), flash memory, or any other suitable memory systems. For example, the memory device 104 may include dynamic random access memory (DRAM).

The CPU 102 may also be connected through the bus 106 to an input/output (I/O) device interface 112 configured to connect the computing device 100 to one or more I/O devices 114. The I/O devices 114 may include, for example, a keyboard and a pointing device, wherein the pointing device may include a touchpad or a touchscreen, among others. The I/O devices 114 may be built-in components of the computing device 100, or may be devices that are externally connected to the computing device 100. In some examples, the memory 104 may be communicatively coupled to I/O devices 114 through direct memory access (DMA).

The CPU 102 may also be linked through the bus 106 to a display interface 116 configured to connect the computing device 100 to a display device 118. The display device 118 may include a display screen that is a built-in component of the computing device 100. The display device 118 may also include a computer monitor, television, or projector, among others, that is internal to or externally connected to the computing device 100.

The CPU 102 may also be linked through the bus 106 to a high bandwidth serial user interface 120 configured to connect the computing device 100 to a peripheral device 122. For example, the peripheral device can be a touch-enabled display or a camera, among other high bandwidth peripheral devices. In some examples, the high bandwidth serial user interface 120 can include a power management module 124 that can used to implement the techniques of FIGS. 2-3 below. In some examples, the high bandwidth serial user interface 120 can be bidirectional and/or duplex. For example, the high bandwidth serial user interface 120 can support a low power state on both a clock lane and a data lane. On the data lane, an ultra-low power state can be entered and exited by a host computing device 100. On the clock lane, an ultra-low power state can be controlled by the peripheral device 122.

The computing device also includes a storage device 126. The storage device 126 is a physical memory such as a hard drive, an optical drive, a thumbdrive, an array of drives, or any combinations thereof. The storage device 126 may also include remote storage drives.

The computing device 100 may also include a network interface controller (NIC) 128. The NIC 128 may be configured to connect the computing device 100 through the bus 106 to a network 130. The network 130 may be a wide area network (WAN), local area network (LAN), or the Internet, among others. In some examples, the device may communicate with other devices through a wireless technology. For example, Bluetooth® or similar technology may be used to connect with other devices.

The block diagram of FIG. 1 is not intended to indicate that the computing device 100 is to include all of the components shown in FIG. 1. Rather, the computing system 100 can include fewer or additional components not illustrated in FIG. 1, such as sensors, power management integrated circuits, additional network interfaces, additional peripheral devices, and the like. The computing device 100 may include any number of additional components not shown in FIG. 1, depending on the details of the specific implementation.

Figure 2:
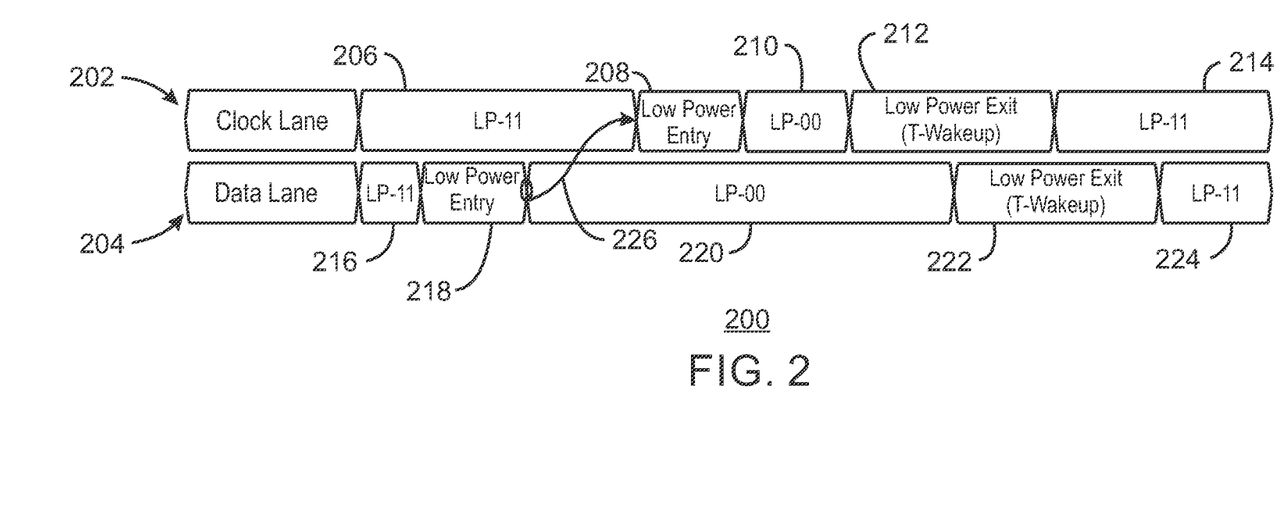
FIG. 2 is a system flow diagram of an example system that can be used to manage power at a link layer of a user interface.

FIG. 2 is a system flow diagram of an example system that can be used to manage power at a link layer of a user interface. The example system is generally referred to by the reference number 200 and can be implemented using the power management module 124 of FIG. 1 above.

In the example system 200, two lanes of a link layer are shown, including a clock lane 202 and a data lane 204. The clock lane 202 and data lane 204 are shown entering and exiting a low power state. The clock lane 202 can be controlled by a device, such as the peripheral device 122 of FIG. 1. The data lane 204 can be controlled by a host. For example, the computing device 100 of FIG. 1 can control the data lane 204.

At block 206, the clock lane 202 is in a high voltage power state LP-11. At block 208, the clock lane 202 is in a low power entry state. At block 210, the clock lane 202 is in a low power state. For example, the clock lane 202 may have zero voltage in the low power state while the data lane 204 also has zero voltage as described below. At block 212, the clock lane 202 is in a low power exit state. For example, the low power exit state may correspond to a wakeup resulting from a touch of a touchscreen peripheral device. At block 214, the clock lane 202 is again in a high voltage power state LP-11.

At block 216, the data lane is in a high voltage power state LP-11. At block 218, the data lane 204 is in a low power entry state. At block 220, the data lane 204 is in a low power state. For example, the data lane 204 may have zero voltage at block 220. At block 222, the data lane 204 is in a low power exit state. For example, the low power exit state may be associated with a touch screen wakeup event. At block 224, the data lane 204 returns to the high voltage power state LP-11.

Still referring to FIG. 2, an arrow 226 is shown representing a condition of low power entry at the data lane 204 in block 218 being met and causing low power entry of the clock lane 202 at the block 208. As shown in FIG. 2, this causes both the clock lane 202 and the data lane 204 to be at the low power state at the same time. The condition of both lanes being in a low power state is referred to herein as an ultra-low power state (ULPS). As also shown in FIG. 2, a host can initiate low power state entry via the data lane 204, while either the device can initiate a low power state exit. For example, the host can initiate a low power exit via the data lane and the peripheral device can initiate a low power exit via a clock lane. In some examples, during a low power exit, the host can only leave the high voltage state after the clock lane exits the low power state and enters a high voltage state. In some examples, once one of the lanes starts the low power exit sequence, the other lane can immediately start the low power exit sequence in parallel in order to reduce response time.

The diagram of FIG. 2 is not intended to indicate that the example system 200 is to include all of the components shown in FIG. 2. Further, the example system 200 may include any number of additional components not shown in FIG. 2, depending on the details of the specific implementation. In some examples, the example system 200 may include additional low power states, among other additional components. Nor is the diagram of FIG. 2 intended to indicate that the blocks of the example system 200 are to be executed in any particular order. For example, as discussed in greater detail below, the low power exit 222 may alternatively occur before and cause the low power exit 212.

Figure 3:
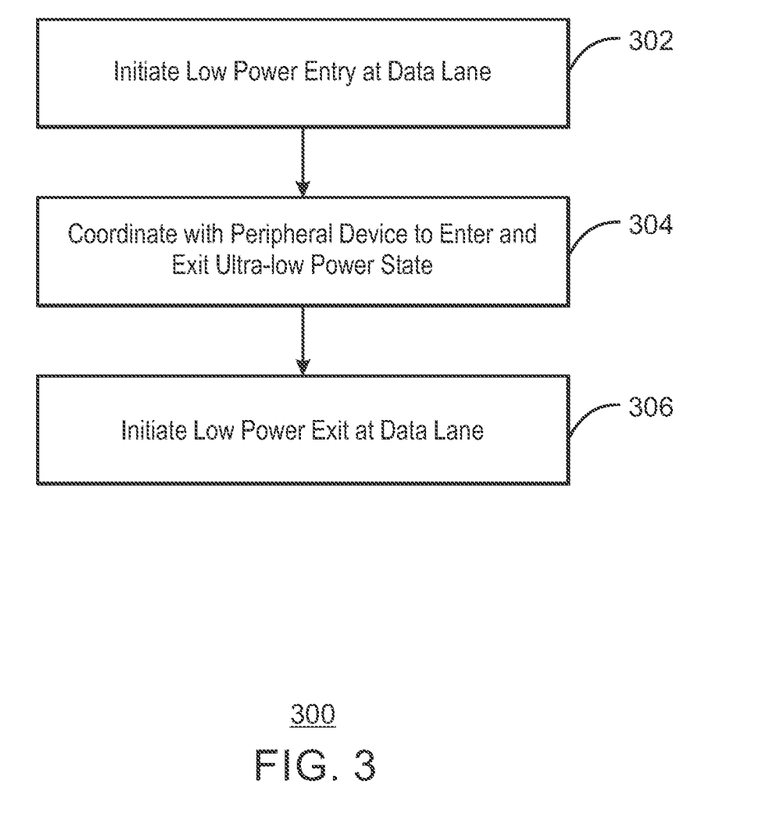
FIG. 3 is a block flow diagram of an example method for managing power at a link layer of a user interface.

FIG. 3 is a block flow diagram of an example method for managing power at a link layer of a user interface. The example method is generally referred to by the reference number 300. The method can be implemented in the example system 100 acting as a host via the power management module 124 of FIG. 1 above.

At block 302, a host initiates a low power entry at a data lane. For example, a computing device can initiate a low power entry at a data lane of a high bandwidth serial user interface connected to the peripheral device. In some examples, the peripheral device is not allowed to initiate low power entry on either the clock lane or the data lane.

At block 304, the host coordinates with the peripheral device to enter and exit an ultra-low power state. For example, the host may detect an exit of the ultra-low power state from the peripheral device via a voltage on the clock lane. The host can exit the power saving state on the data lane in response to detecting the exit of the low power state at the clock lane by the peripheral device.

At block 306, the host initiates a low power exit at the data lane. For example, the host and peripheral device may initially be in a very low power state, such as an ultra-low power state (ULPS). The host can initiate an exit from the ULPS by raising the voltage at the data lane of a high bandwidth serial user interface. The peripheral device can then detect the voltage at the data lane. In some examples, the low power exit can be pipelined. For example, once the host starts the low power exit sequence at the data lane, the peripheral device can immediately start the low power exit at the clock lane in parallel in order to reduce response time.

This process flow diagram is not intended to indicate that the blocks of the example method 300 are to be executed in any particular order, or that all of the blocks are to be included in every case. Further, any number of additional blocks not shown may be included within the example method 300, depending on the details of the specific implementation.

Figure 4:
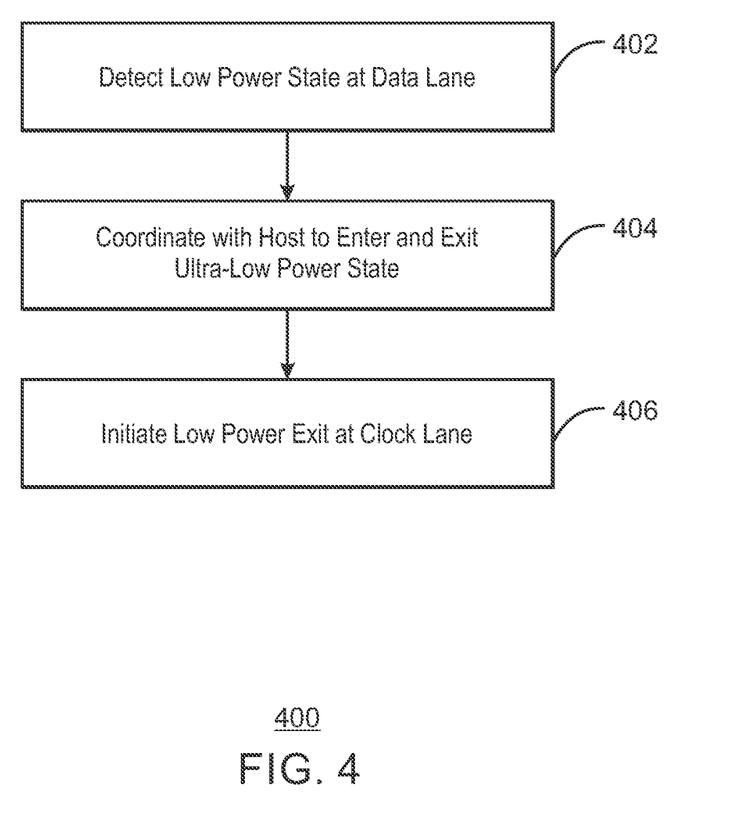
FIG. 4 is another block flow diagram of an example method for managing power at a link layer of a user interface.

FIG. 4 is a block flow diagram of another example method for managing power at a link layer of a user interface. The example method is generally referred to by the reference number 400. The method can be implemented using the peripheral device 122 and the high bandwidth serial user interface 120 of FIG. 1 above.

At block 402, the peripheral device detects a low power state at a data lane. For example, the peripheral device can detect the low power entry voltage at a data lane of a high bandwidth serial user interface coupled to the peripheral device. In some examples, the peripheral device is not allowed to initiate low power entry on either clock or data lane.

At block 404, the peripheral device coordinates with the host to enter and exit an ultra-low power state. For example, the peripheral device can start a low power state entry on the clock lane in response to detecting the low power state voltage at the data lane. In some examples, the peripheral device may detect an exit command from the host via the data lane. The peripheral device can then exit the power saving state on the clock lane in response to detecting a voltage change on the data lane from the host. For example, the peripheral can raise the voltage on the clock lane in response to detecting an increase in voltage on the data lane and thus an exit from the ULPS.

At block 406, the peripheral device initiates a low power exit at a clock lane. For example, the host and peripheral device may still be in a very low power state, such as an ultra-low power state (ULPS). The peripheral device can exit the ULPS by increasing voltage on the clock lane of the high bandwidth serial user interface. In some examples, the ultra-low power state exit can be pipelined. For example, once the peripheral device starts the low power exit sequence on the clock lane, the host can immediately start the low power exit on the data lane in parallel in order to reduce response time. Thus, both the clock lane and the data lane can be returned to a normal operating voltage in a reduced response time.

This process flow diagram is not intended to indicate that the blocks of the example method 400 are to be executed in any particular order, or that all of the blocks are to be included in every case. Further, any number of additional blocks not shown may be included within the example method 400, depending on the details of the specific implementation.

EXAMPLES

Example 1 is a method for power management of a user interface. The method includes initiating a low power entry at a data lane of the user interface. The method includes coordinating with a peripheral device to enter into an ultra-low power state. The peripheral device is to initiate a low power entry at the clock lane to enter the user interface into an ultra-low power state in response to detecting the low power entry at the data lane.

Example 2 includes the method of example 1, including or excluding optional features. In this example, the method includes initiating a low power exit at the data lane of the user interface to exit the ultra-low power state.

Example 3 includes the method of any one of examples 1 to 2, including or excluding optional features. In this example, the method includes detecting an exit of the ultra-low power state at the clock lane and exiting the low power state at the data lane in response to detecting the exit of the ultra-low power state.

Example 4 includes the method of any one of examples 1 to 3, including or excluding optional features. In this example, initiating the low power entry at the data lane includes providing zero voltage at the data lane.

Example 5 includes the method of any one of examples 1 to 4, including or excluding optional features. In this example, the method includes immediately initiating a low power exit sequence at the data lane in response to detecting a start of a low power exit sequence at the clock lane to pipeline an exit from the ultra-low power state.

Example 6 includes the method of any one of examples 1 to 5, including or excluding optional features. In this example, the method includes increasing the voltage on the data lane to exit the ultra-low power state.

Example 7 includes the method of any one of examples 1 to 6, including or excluding optional features. In this example, initiating the low power entry at the data lane is to be performed by a host device.

Example 8 includes the method of any one of examples 1 to 7, including or excluding optional features. In this example, the method includes initiating a low power exit in response to detecting a touch response wakeup, wherein the peripheral device includes a touch-enabled display.

Example 9 includes the method of any one of examples 1 to 8, including or excluding optional features. In this example, the peripheral device includes a camera.

Example 10 includes the method of any one of examples 1 to 9, including or excluding optional features. In this example, the user interface includes a high bandwidth serial user interface.

Example 11 is a method for power management of a user interface. The method includes detecting an entry into a low power state by a host device at a data lane. The method includes coordinating with the host device to enter into an ultra-low power state by initiating a low power entry at the clock lane to enter the user interface into the ultra-low power state.

Example 12 includes the method of example 11, including or excluding optional features. In this example, the method includes coordinating with the host device to exit the low power state in response to detecting an exit from the low power state by the host device at the data lane.

Example 13 includes the method of any one of examples 11 to 12, including or excluding optional features. In this example, the method includes initiating a low power exit at a clock lane by increasing the voltage at the clock lane.

Example 14 includes the method of any one of examples 11 to 13, including or excluding optional features. In this example, detecting entry into the low power state include detecting zero voltage on the data lane.

Example 15 includes the method of any one of examples 11 to 14, including or excluding optional features. In this example, the method includes immediately initiating a low power exit sequence at the clock lane in response to detecting a start of a low power exit sequence at the data lane to pipeline an exit from the ultra-low power state.

Example 16 includes the method of any one of examples 11 to 15, including or excluding optional features. In this example, the method includes increasing voltage on the clock lane to exit the ultra-low power state.

Example 17 includes the method of any one of examples 11 to 16, including or excluding optional features. In this example, the method includes initiating a low power exit at a clock lane via a peripheral device in response to detecting a touch, wherein the peripheral device includes a touch-enabled display.

Example 18 includes the method of any one of examples 11 to 17, including or excluding optional features. In this example, coordinating with the host device includes lowering the voltage at the clock lane in response to detecting a lowered voltage on the data lane.

Example 19 includes the method of any one of examples 11 to 18, including or excluding optional features. In this example, the method includes initiating a low power exit at the clock lane in response to detecting a touch screen wakeup event.

Example 20 includes the method of any one of examples 11 to 19, including or excluding optional features. In this example, the user interface includes a high bandwidth serial user interface.

Example 21 is a system for power management. The system includes a user interface including a data lane and a clock lane to send and receive data. The system also includes a host device coupled to the user interface to initiate a low power entry at the data lane of the user interface and cause a peripheral device to initiate a low power entry at the clock lane to enter the user interface into an ultra-low power state.

Example 22 includes the system of example 21, including or excluding optional features. In this example, the host device is to further initiate an exit from the ultra-low power state by increasing voltage at the data lane.

Example 23 includes the system of any one of examples 21 to 22, including or excluding optional features. In this example, the peripheral device includes a camera or a touch-enabled display.

Example 24 includes the system of any one of examples 21 to 23, including or excluding optional features. In this example, the user interface includes a high bandwidth serial user interface.

Example 25 includes the system of any one of examples 21 to 24, including or excluding optional features. In this example, the user interface includes a half duplex interface.

Example 26 includes the system of any one of examples 21 to 25, including or excluding optional features. In this example, the peripheral device is to control the clock lane and the host device is to control the data lane.

Example 27 includes the system of any one of examples 21 to 26, including or excluding optional features. In this example, the low power entry includes a lowering of a voltage.

Example 28 includes the system of any one of examples 21 to 27, including or excluding optional features. In this example, the ultra-low power state includes a condition of both the clock lane and the data lane being in a low power state.

Example 29 includes the system of any one of examples 21 to 28, including or excluding optional features. In this example, the host device is to initiate a low power exit at the data lane in response to detecting a low power exit at the clock lane.

Example 30 includes the system of any one of examples 21 to 29, including or excluding optional features. In this example, the host device is to initiate a low power exit at the data lane in response to detecting a low power exit corresponding to a touch screen wakeup event.

Example 31 is a system for power management. The system includes a user interface including a data lane and a clock lane to send and receive data. The system also includes a peripheral device coupled to the user interface to detect a low power entry at the data lane of the user interface and initiate a low power entry at the clock lane to enter the user interface into an ultra-low power state in response to detecting the low power entry at the data lane.

Example 32 includes the system of example 31, including or excluding optional features. In this example, the peripheral device is to initiate an exit from the ultra-low power state by increasing the voltage at the clock lane.

Example 33 includes the system of any one of examples 31 to 32, including or excluding optional features. In this example, the peripheral device includes a camera or a touch-enabled display.

Example 34 includes the system of any one of examples 31 to 33, including or excluding optional features. In this example, the user interface includes a high bandwidth serial user interface.

Example 35 includes the system of any one of examples 31 to 34, including or excluding optional features. In this example, the user interface includes a half duplex interface.

Example 36 includes the system of any one of examples 31 to 35, including or excluding optional features. In this example, the peripheral device is to initiate a low power exit at the clock lane by increasing the voltage at the clock lane in response to detecting a low power exit at the data lane.

Example 37 includes the system of any one of examples 31 to 36, including or excluding optional features. In this example, the peripheral device is to initiate a low power exit at the clock lane by increasing the voltage at the clock lane in response to detecting a touch screen wakeup event.

Example 38 includes the system of any one of examples 31 to 37, including or excluding optional features. In this example, the peripheral device is to control the clock lane.

Example 39 includes the system of any one of examples 31 to 38, including or excluding optional features. In this example, a host device is to control the data lane.

Example 40 includes the system of any one of examples 31 to 39, including or excluding optional features. In this example, the ultra-low power state includes a condition of both the clock lane and the data lane being in a low power state Example 41 is an apparatus for power management. The apparatus includes a data lane to enter a low power state to initiate an ultra-low power state. The apparatus also includes a clock lane to enter the low power state in response to the data lane entering the low power state to enter the apparatus into the ultra-low power state.

Example 42 includes the apparatus of example 41, including or excluding optional features. In this example, the data lane is to increase voltage to initiate an exit from the ultra-low power state and the clock lane is to increase voltage in response to the increase in voltage in the data lane to exit from the ultra-low power state.

Example 43 includes the apparatus of any one of examples 41 to 42, including or excluding optional features. In this example, the clock lane is to increase voltage to initiate an exit from the ultra-low power state and the data lane is to increase voltage in response to the increase in voltage in the data lane to exit from the ultra-low power state.

Example 44 includes the apparatus of any one of examples 41 to 43, including or excluding optional features. In this example, the apparatus includes a high bandwidth serial user interface.

Example 45 includes the apparatus of any one of examples 41 to 44, including or excluding optional features. In this example, the apparatus includes a half duplex interface.

Example 46 includes the apparatus of any one of examples 41 to 45, including or excluding optional features. In this example, the low power state includes zero voltage.

Example 47 includes the apparatus of any one of examples 41 to 46, including or excluding optional features. In this example, the low power state includes a reduced voltage.

Example 48 includes the apparatus of any one of examples 41 to 47, including or excluding optional features. In this example, the ultra-low power state includes a condition of both the clock lane and the data lane being in the low power state.

Example 49 includes the apparatus of any one of examples 41 to 48, including or excluding optional features. In this example, a host device is to initiate a low power exit at the data lane in response to detecting a low power exit at the clock lane.

Example 50 includes the apparatus of any one of examples 41 to 49, including or excluding optional features. In this example, the clock lane is to increase voltage to initiate an exit from the ultra-low power state in response to detecting a low power exit corresponding to a touch screen wakeup event.

Example 51 is a system for power management. The system includes means for sending and receiving data at a user interface. The system also includes means for initiating a low power entry at the user interface. The system further includes means for entering the user interface into an ultra-low power state in response to detecting the low power entry.

Example 52 includes the system of example 51, including or excluding optional features. In this example, the system includes means for initiating an exit from the ultra-low power state in response to detecting a low power exit.

Example 53 includes the system of any one of examples 51 to 52, including or excluding optional features. In this example, the user interface is coupled to a peripheral device including a camera or a touch-enabled display.

Example 54 includes the system of any one of examples 51 to 53, including or excluding optional features. In this example, the user interface includes a high bandwidth serial user interface.

Example 55 includes the system of any one of examples 51 to 54, including or excluding optional features. In this example, the user interface includes a half duplex interface.

Example 56 includes the system of any one of examples 51 to 55, including or excluding optional features. In this example, the system includes means for controlling the means for sending and receiving data.

Example 57 includes the system of any one of examples 51 to 56, including or excluding optional features. In this example, the low power entry includes a lowering of a voltage.

Example 58 includes the system of any one of examples 51 to 57, including or excluding optional features. In this example, the ultra-low power state includes a condition of both the means for sending and receiving data being in a low power state.

Example 59 includes the system of any one of examples 51 to 58, including or excluding optional features. In this example, the system includes means to initiate a low power exit in response to detecting a low power exit from a peripheral device.

Example 60 includes the system of any one of examples 51 to 59, including or excluding optional features. In this example, the system includes means to initiate a low power exit at a data lane in response to detecting a low power exit corresponding to a touch screen wakeup event.

An embodiment is an implementation or example. Reference in the specification to "an embodiment", "one embodiment", "some embodiments", "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method for power management of a user interface, comprising:
   initiating, via a host device, an ultra-low power state via a low power entry at a data lane of the user interface, wherein initiating the low power entry at the data lane comprises providing zero voltage at the data lane;
   coordinating with a peripheral device to enter into the ultra-low power state, wherein the peripheral device is to reduce a voltage at the clock lane to enter the user interface into the ultra-low power state in response to detecting the low power entry at the data lane; and detecting an exit, initiated via the peripheral device, from the ultra-low power state via an increase in the voltage at the clock lane.

2. The method of claim 1, comprising initiating a low power exit at the data lane of the user interface to exit the ultra-low power state.

3. The method of claim 1, comprising detecting an exit of the ultra-low power state at the clock lane and exiting the low power state at the data lane in response to detecting the exit of the ultra-low power state.

4. The method of claim 1, comprising immediately initiating a low power exit sequence at the data lane in response to detecting a start of a low power exit sequence at the clock lane to pipeline an exit from the ultra-low power state.

5. A method for power management of a user interface, comprising:
   detecting an entry into a low power state initiated by a host device at a data lane, wherein detecting entry into the low power state comprises detecting that zero voltage is provided on the data lane;
   coordinating, via a peripheral device, with the host device to enter into an ultra-low power state by lowering a voltage at a clock lane to enter the user interface into the ultra-low power state; and
   initiating an exit, via the peripheral device, from the ultra-low power state by increasing the voltage at the clock lane.

6. The method of claim 5, comprising coordinating with the host device to exit the low power state in response to detecting an exit from the low power state by the host device at the data lane.

7. The method of claim 5, comprising immediately initiating a low power exit sequence at the clock lane in response to detecting a start of a low power exit sequence at the data lane to pipeline an exit from the ultra-low power state.

8. A system for power management, comprising:
   a user interface comprising a data lane and a clock lane to send and receive data; and
   a host device coupled to the user interface to initiate a low power entry at the data lane of the user interface and cause a peripheral device to initiate a low power entry at the clock lane to enter the user interface into an ultra-low power state, wherein initiating the low power entry at the data lane comprises providing zero voltage at the data lane, wherein the host device is to detect an exit, initiated via the peripheral device, from the ultra-low power state via an increase in the voltage at the clock lane.

9. The system of claim 8, wherein the host device is to further initiate an exit from the ultra-low power state by increasing voltage at the data lane.

10. The system of claim 8, wherein the peripheral device comprises a camera or a touch-enabled display.

11. The system of claim 8, wherein the user interface comprises a high bandwidth serial user interface.

12. The system of claim 8, wherein the user interface comprises a half duplex interface.

13. A system for power management, comprising:
   a user interface comprising a data lane and a clock lane to send and receive data; and
   a peripheral device coupled to the user interface to detect a low power entry initiated by a host device at the data lane of the user interface and cause a low power entry at the clock lane to enter the user interface into an ultra-low power state in response to detecting the low power entry at the data lane, wherein detecting entry into the low power state comprises detecting that zero voltage is provided on the data lane, and wherein the peripheral device is to initiate an exit from the ultra-low power state by increasing the voltage at the clock lane.

14. The system of claim 13, wherein the peripheral device comprises a camera or a touch-enabled display.

15. The system of claim 13, wherein the user interface comprises a high bandwidth serial user interface.

16. The system of claim 13, wherein the user interface comprises a half duplex interface.

17. The method of claim 1, comprising increasing, via the host device, the voltage at the data lane in response to detecting the increase in the voltage at the clock lane.

* * * * *